(12) United States Patent
Geerlings et al.

(10) Patent No.: US 8,784,771 B2
(45) Date of Patent: Jul. 22, 2014

(54) PROCESS FOR PREPARING TI-DOPED HYDRIDES

(75) Inventors: Jacobus Johannes Cornelis Geerlings, Amsterdam (NL); Peter Marie Paulus, Amsterdam (NL); Hans Arie Stil, Amsterdam (NL)

(73) Assignee: Shell Oil Company, Houston, TX (US)

( * ) Notice: Subject to any disclaimer, the term of this patent is extended or adjusted under 35 U.S.C. 154(b) by 1283 days.

(21) Appl. No.: 12/599,940

(22) PCT Filed: May 14, 2008

(86) PCT No.: PCT/EP2008/055925
§ 371 (c)(1),
(2), (4) Date: Jun. 2, 2010

(87) PCT Pub. No.: WO2008/138954
PCT Pub. Date: Nov. 20, 2008

(65) Prior Publication Data
US 2010/0233075 A1 Sep. 16, 2010

(30) Foreign Application Priority Data
May 15, 2007 (EP) .................................... 07108220

(51) Int. Cl.
*C01B 6/24* (2006.01)
*C01B 3/04* (2006.01)

(52) U.S. Cl.
USPC ...................................... 423/644; 423/648.1

(58) Field of Classification Search
USPC ............... 423/648.1, 658.2, 644; 252/182.35; 429/20, 22; 264/117; 206/0.6
See application file for complete search history.

(56) References Cited

U.S. PATENT DOCUMENTS

| 6,106,801 A * | 8/2000 | Bogdanovic et al. ....... 423/648.1 |
| 2001/0051130 A1 * | 12/2001 | Jensen et al. .................. 423/644 |
| 2004/0009121 A1 * | 1/2004 | Jensen et al. ............... 423/648.1 |

FOREIGN PATENT DOCUMENTS

DE 19526434 1/1997 ............... B01J 20/08

OTHER PUBLICATIONS

Borislav Bogdanovic, Manfred Schwickardi "Ti-doped alkali metal aluminium hydrides as potential novel reversible hydrogen storage materials", Journal of Alloys and Compounds 253-254 (1997), pp. 1-9 (Elsevior).

* cited by examiner

*Primary Examiner* — Wayne Langel
*Assistant Examiner* — Syed Iqbal

(57) ABSTRACT

The present invention provides a process for the preparation of Ti-doped alkali metal and/or alkaline-earth metal aluminum hydride, comprising intimately mixing: an alkali metal and/or alkaline-earth metal aluminum hydride, or at least one alkali metal hydride and/or alkaline-earth metal hydride, metallic aluminum and $H_2$, with in the range of from 0.5 to 20 mol % of $Ti(OCH_3)_4$, based on the moles of Al in the prepared Ti-doped alkali metal and/or alkaline-earth metal aluminum hydride. The invention further relates to a Ti-doped alkali metal and/or alkaline-earth metal aluminum hydride, obtainable by a process according to the invention, a hydrogen storage material comprising a Ti-doped alkali metal and/or alkaline-earth metal aluminum hydride according the invention, a process for reversibly desorbing and/or absorbing hydrogen, the use of a Ti-doped alkali metal and/or alkaline-earth metal aluminum hydride according to invention to store hydrogen and the use of $Ti(OCH_3)_4$ as Ti-dopant for an alkali metal and/or alkaline-earth metal aluminum hydride.

13 Claims, No Drawings

PROCESS FOR PREPARING TI-DOPED HYDRIDES

The present application claims priority from European Patent Application 07108220.0 filed 15 May 2007.

FIELD OF THE INVENTION

The present invention relates to a process for preparing a Ti-doped alkali metal and/or alkaline-earth metal aluminium hydride and to Ti-doped alkali metal and/or alkaline-earth metal aluminium hydride obtainable by such process, and the use thereof. The invention further relates to a hydrogen storage material and a process for reversibly absorbing and/or desorbing hydrogen. The invention even further relates to the use of $Ti(OCH_3)_4$ as Ti-dopant for an alkali metal and/or alkaline-earth metal aluminium hydride.

BACKGROUND OF THE INVENTION

The storage of hydrogen in the form of metal hydrides has gained a lot of attention in the recent years. Storage of hydrogen in metal hydrides has the advantage over storage of for instance liquid or compressed hydrogen in that it does not require the use of low temperatures or excessive pressures. A disadvantage of the use of metal hydrides is relatively low storage density per weight of storage material (expressed in wt % of $H_2$ per weight of metal hydride) and slow reversible absorption and desorption kinetics. A prime candidate for storing hydrogen in metal hydrides is $NaAlH_4$. With $NaAlH_4$ a storage density per weight of storage material of up to 5 wt % of hydrogen can be attained. In for instance U.S. Pat. No. 6,106,801 it has been disclosed that the process of hydrogen release and uptake by alkali metal alanates can be accelerated or made to proceed more complete by the addition of catalyst, in particular with a compound of a transition metal of group 3 or 4 of the Periodic Table of Elements. As preferred dopants are mentioned: alcoholates, halides, hydrides and organo-metallic and inter-metallic compounds of the mentioned metals. U.S. Pat. No. 6,106,801 specifically mentions doping of $NaAlH_4$ with $TiCl_3$, $TiCl_4$ and $Ti(OBu)_4$. However, in practice, the rate of hydrogen uptake is of these materials is still too small for commercial application in for instance automotive applications.

SUMMARY OF THE INVENTION

By intimately mixing an alkali metal and/or alkaline-earth metal aluminium hydride with $Ti(OCH_3)_4$ (also known as $Ti(OMe)_4$) as dopant, a Ti-doped alkali metal and/or alkaline-earth metal aluminium hydride is obtained which, at temperatures above 115° C. shows an increased hydrogen absorption rate compared to known Ti-doped alkali alanate hydride prepared using either $TiCl_3$, $TiCl_4$ or $Ti(OBu)_4$ dopants.

Accordingly, the present invention provides a process for the preparation of Ti-doped alkali metal and/or alkaline-earth metal aluminium hydride, comprising intimately mixing:
  an alkali metal and/or alkaline-earth metal aluminium hydride, or
  at least one alkali metal hydride and/or alkaline-earth metal hydride, metallic aluminium and $H_2$,
  with from 0.5 to 20 mol % of $Ti(OCH_3)_4$, based on the moles of Al in the prepared Ti-doped alkali metal and/or alkaline-earth metal aluminium hydride.

Reference herein to a Ti-doped alkali metal and/or alkaline-earth metal aluminium hydride is to a Ti-doped hydride of an alloy of aluminium and at least one other metal being an alkali metal and/or alkaline-earth metal of group 1 and 2 of the Periodic Table of Elements. In the description the shorter denomination "Ti-doped hydride" will also be used when referring to a Ti-doped alkali metal and/or alkaline-earth metal aluminium hydride.

Hydrogen is stored in an alkali metal and/or alkaline-earth metal aluminium hydride by subjecting the alkali metal and/or alkaline-earth metal aluminium hydride to a hydrogen-comprising gas at a pressure above the equilibrium pressure of the alkali metal and/or alkaline-earth metal aluminium hydride. During hydrogen uptake, the temperature of the hydride may increase rapidly to temperatures exceeding 150° C. due to the heat of formation that is released during formation of the hydride. The Ti-doped hydride prepared using the process according to the invention shows an improved absorption behaviour at temperatures above 115° C. compared to Ti-doped hydrides prepared with prior art processes. This improved behaviour is the result of the use of $Ti(OMe)_4$ as Ti-dopant. Consequently, the use of Ti-doped hydride prepared using the process according to the invention may allow for shorter refueling times.

Furthermore, the use of $Ti(OMe)_4$ allows for the preparation of a Ti-doped alkali metal and/or alkaline-earth metal aluminium hydride with an improved storage density per weight of storage material compared to Ti-doped alkali metal and/or alkaline-earth metal aluminium hydrides prepared with a $Ti(OBu)_4$ precursor due to the lower weight of the —(OMe) group.

In another aspect, the invention relates to a Ti-doped alkali metal and/or alkaline-earth metal aluminium hydride obtainable by a process according to the invention.

In a further aspect, the invention relates to a hydrogen storage material comprising a Ti-doped alkali metal and/or alkaline-earth metal aluminium hydride according to the invention.

In an even further aspect, the invention relates to a process for reversibly desorbing and/or absorbing hydrogen comprising:
  dehydrating an at least partially hydrated Ti-doped alkali metal and/or alkaline-earth metal aluminium hydride according to the invention by subjecting the Ti-doped alkali metal and/or alkaline-earth metal aluminium hydride to a temperature of in the range of from 20 to 140° C. and removing a hydrogen-comprising gas to obtain a hydrogen-comprising gas and an at least partially dehydrated Ti-doped alkali metal and/or alkaline-earth metal aluminium hydride; and/or
  hydrating an at least partially dehydrated Ti-doped alkali metal and/or alkaline-earth metal aluminium hydride according to the invention by contacting the at least partially dehydrated Ti-doped alkali metal and/or alkaline-earth metal aluminium hydride with a hydrogen-comprising gas at a temperature in the range of from 115 to 180° C. and a hydrogen partial pressure above the equilibrium hydrogen pressure of the at least partially dehydrated Ti-doped alkali metal and/or alkaline-earth metal aluminium hydride to reversibly store hydrogen.

In a still further aspect, the invention relates to the use of a Ti-doped alkali metal and/or alkaline-earth metal aluminium hydride according to the invention or a hydrogen storage material according to the invention to store hydrogen.

In a still even further aspect, the invention relates to the use of $Ti(OCH_3)_4$ as Ti-dopant for an alkali metal and/or alkaline-earth metal aluminium hydride.

DETAILED DESCRIPTION OF THE INVENTION

The present invention relates to the preparation of a Ti-doped alkali metal and/or alkaline-earth metal aluminium hydride. The alkali or alkaline-earth metal herein is a metal of group 1 or 2 of the Periodic Table of Elements, i.e. Li, Na, K, Rb, GS Cs, Fr, Be, Mg, Ca, Sr, Ba and Ra. Preferably, the alkali and/or alkaline-earth metal is Li, Na, K, Mg, or Ca, more preferably Li, Na, Mg or Ca, even more preferably Li, Na, or Mg. The Ti-doped hydride may be prepared by intimately mixing an alkali metal and/or alkaline-earth metal aluminium hydride with Ti(OMe)$_4$. Preferably, the alkali metal and/or alkaline-earth metal aluminium hydride is an aluminium hydride of the general formula:

   (1)

with

A,B=an alkali or alkaline-earth metal, preferably Li, Na, Mg or Ca, more preferably Li, Na, or Mg, n,m=metal ion valence, i.e. 1, 2 or 3, $0 \leq x \leq 1$, and $1 \leq p \leq 3$ More preferably, the alkali metal and/or alkaline-earth metal aluminium hydride is NaAlH$_4$, LiMg(AlH$_4$)$_3$ or Na$_2$LiAlH$_6$, even more preferably NaAlH$_4$.

In an equally preferred alternative preparation route, the Ti-doped hydride may be prepared by intimately mixing at least one alkali metal hydride and/or alkaline-earth metal hydride, metallic aluminium and H$_2$, with Ti(OMe)$_4$.

Preferably, the alkali and/or alkaline-earth metal hydride is at least one of a hydride of Li, Na, Mg and/or Ca, more preferably Li, Na, and/or Mg.

Preferably, (i) 3 parts NaH, 4.5 parts H$_2$ and at least 3 parts Al, (ii) 2 parts LiH, 2 parts MgH$_2$, 9 parts H$_2$ and at least 6 parts Al, or (iii) 4 parts NaH, 2 parts LiH, 3 parts H$_2$ and at least 2 parts Al are mixed with Ti(OCH$_3$)$_4$, more preferably 3 parts NaH, 4.5 part H$_2$ and at least 3 parts Al.

As some of the Al may irreversibly combine with Ti to form an alloy, which has unfavourable hydride formation properties, some additional or sacrificial Al may be added to the mixture. It should be noted, however, that addition of Al may lead to a reduced storage density per weight of storage material. Therefore, the addition of sacrificial Al should be done with care. Preferably, the number of moles of sacrificial Al does not exceed 3 equivalents aluminium based on the number of moles of Ti admixed.

The Ti-doped hydride may be prepared by intimately mixing an alkali metal and/or alkaline-earth metal aluminium hydride, or at least one alkali metal hydride and/or alkaline-earth metal hydride, metallic aluminium and H$_2$, with from 0.5 to 20 mol % of Ti(OMe)$_4$, based on the moles of Al in the prepared Ti-doped hydride. Preferably, the Ti(OMe)$_4$ is mixed in an amount of from 1 to 10 mol %, more preferably of from 2 to 5 mol %, based on the moles of Al in the prepared Ti-doped hydride. A high amount of dopant may improve the desorption/absorption behaviour of the obtained Ti-doped hydride, however this also leads to an increased amount of "dead weight" added to the system. Additionally, an increased amount of aluminium is alloyed with titanium and therefore unavailable for the absorption process.

The components may be intimately mixed in an inert atmosphere, i.e. in an atmosphere comprising no other reactive gaseous or vapour component other than hydrogen. For instance, to prevent oxidation of one or more of the components, the atmosphere should not comprise oxygen. Examples of suitable atmospheres are for example atmospheres, comprising nitrogen, hydrogen, argon gas or mixtures thereof.

The components may be intimately mixed with Ti(OMe)$_4$ by dry or wet mixing. Reference herein to dry mixing is mixing methods, wherein at least one of the components is in the solid or suspended state. A suitable dry mixing method for attaining intimate mixing is ball-milling. Reference herein to wet mixing is to a mixing method wherein all the components are either in the liquid or dissolved state. Suitable solvents are organic aprotic solvents such as tetrahydrofuran (THF) or toluene. In wet mixing methods, the liquids and/or solutions are mixed and subsequently dried while removing the solvents.

The invention also relates to the Ti-doped hydride, obtainable by a process for the preparation of Ti-doped alkali metal and/or alkaline-earth metal aluminium hydride, comprising intimately mixing:

an alkali metal and/or alkaline-earth metal aluminium hydride, or at least one alkali metal hydride and/or alkaline-earth metal hydride, metallic aluminium and H$_2$, with from 0.5 to 20 mol % of Ti(OCH$_3$)$_4$, based on the moles of Al in the prepared Ti-doped alkali metal and/or alkaline-earth metal aluminium hydride.

Preferably, the obtained Ti-doped hydride is Ti-doped NaAlH$_4$, LiMg(AlH$_4$)$_2$ or Na$_2$LiAlH$_6$, more preferably Ti-doped NaAlH$_4$. When sufficiently heated, such hydrides may reversibly desorb hydrogen. Without wishing to be bound to any particularly theory it is suggested that such hydrides desorb hydrogen in three discrete steps. For example NaAlH4 desorbs hydrogen by:

   (a)

   (b)

   (c)

In step 1, an intermediate hydride is formed. Such intermediate hydrides can be formed during hydrogen absorption or desorption processes or can be the result of the process according to the invention if there are thermodynamic limitations, which prevent full hydration of the Ti-doped hydrides. Although the amount of hydrogen that can be stored in such hydride is less than in hydrides according to the invention which are completely hydrogenated, these materials are also suitable for storing hydrogen, particularly when doped with Ti and prepared according to the process according to the invention and fall with in the scope of the present invention.

The Ti-doped hydride according to the invention may be used alone or in combination with other materials as a hydrogen storage material. Such hydrogen storage material may for instance be used in hydrogen storage tanks or hydrogen batteries.

The Ti-doped hydride according to the invention may be used in a process for reversibly desorbing and/or absorbing hydrogen. It will be appreciated that when a Ti-doped hydride according to the invention is in thermodynamic equilibrium, the hydride is in equilibrium with gaseous hydrogen evolving from the Ti-doped hydride. The equilibrium pressure of the gaseous hydrogen is dependent on the temperature and the type of Ti-doped hydride. It should be noted that the equilibrium pressure may be different for a hydride and an intermediate hydride being formed during the desorption process of that hydride, see reactions (a-c) herein above. Therefore, the equilibrium pressure may change during a complete desorption process, i.e. going from (a) to (c) or vice versa.

A hydrogen-comprising gas may by obtained by a process for desorbing hydrogen. Depending on the type of hydride or intermediate hydride and the desired equilibrium pressure, the at least partially hydrated Ti-doped hydride according to the invention may be dehydrated by subjecting it to a temperature in the range of from 20 to 140° C. The hydrogen-comprising gas evolving from the hydride is removed. The obtained hydrogen-comprising gas may be used as desired and the at least partially dehydrated Ti-doped hydride may be used for further extraction of hydrogen or may be used to store hydrogen by absorption.

Hydrogen may be stored by a hydrogen absorption process. In such a process an at least partially dehydrated Ti-doped hydride according to the invention is hydrated. The at least partially dehydrated Ti-doped hydride may be any at least partially dehydrated Ti-doped hydride according to the invention, but preferably is an at least partially dehydrated Ti-doped hydride obtained from a process for desorbing hydrogen according to the invention. The at least partially dehydrated Ti-doped hydride may be hydrated by contacting it with a hydrogen-comprising gas at a hydrogen partial pressure above the equilibrium hydrogen pressure of the at least partially dehydrated Ti-doped alkali metal and/or alkaline-earth metal aluminium hydride. Preferably, at a pressure of in the range of from 1 to 700 bar, preferably of from 10 to 150 bar, more preferably of from 50 to 100 bar. In the hydrogen absorption process according to the invention, the at least partially dehydrated Ti-doped hydride may be contacted with a hydrogen-comprising gas at a temperature in the range of from 115 to 180° C., preferably of from 120 to 160° C., more preferably of from 130 to 150° C. At such temperatures the at least partially dehydrated Ti-doped hydride according to the invention absorbs hydrogen at a surprisingly high rate compared to prior art Ti-doped hydrides.

EXAMPLES

The process according to the invention will be further illustrated by the following non-limiting examples.

Preparation of Ti-Doped $NaAlH_4$

Ti-doped $NaAlH_4$ has been prepared using $Ti(OMe)_4$ (according to the invention) or $Ti(OBu)_4 (=Ti(OC_4H_9)_4$, not according to the invention) as Ti-dopant.

Both doping reactions were carried out by high-energy ball milling using a SPEX 8000M apparatus. The mixing vial was made of stainless steel and had a volume of 50 ml.

Between 0.5 gram of a mixture comprising of 98 mol % $NaAlH_4$ and 2 mol % dopant (i.e. 2.04 mol % of Ti-dopant, based on the moles of Al in the prepared Ti-doped hydride) was ball-milled using steel balls, one of eight grams and two of one gram each. The vial was kept below 30° C. to prevent thermal release of hydrogen by the $NaAlH_4$. This was done by using solid $CO_2$ that was added to the interior of the ball-mill equipment. A gentle nitrogen purge was applied to provide a cool $CO_2$ stream over the vial.

Hydrogen Desorption and Absorption Measurements

Hydrogen desorption/absorption measurements were performed with a Sievert type apparatus (ex HydroQuebec Company, Canada).

Desorption measurements were carried out by heating the evacuated sample- and reference probes with a rate of 2° C./minute from 25° C. to an end temperature of 140° C. The 95 wt % desorption time was determined by measuring the time necessary to desorb 95 wt % of the absorbed hydrogen during the second desorption half cycle.

Absorptions were carried out at 90 bar hydrogen partial pressure (pure hydrogen) and at elevated temperatures. The 95 wt % and 99 wt % absorption times were determined by measuring the time necessary to absorb 95 wt % and 99 wt % of the total amount of hydrogen absorbed during the second absorption half cycle, respectively. The results are shown in Table 1.

All samples absorbed between 3.7 and 4.0 wt % of hydrogen based on the weight of the Ti-doped system in its fully hydrogenated state. It will be clear from table 1, that the Ti-doped $NaAlH_4$ according to the invention shows equivalent desorption properties when compared to the prior art Ti-doped $NaAlH_4$, i.e. doped with $Ti(OBu)_4$, when being heated to 140° C. However, the hydrogen absorption properties are significantly improved when absorption takes place at temperatures above 115° C., with absorption times reduced by over 50% at 140° C.—

TABLE 1

| Dopant | | Desorption time 95 wt % | Absorption time 95 wt % | Absorption time 99 wt % | Absorption time 95 wt % | Absorption time 99 wt % |
|---|---|---|---|---|---|---|
| | Temperature | ≤140° C. | 115° C. | 115° C. | 140° C. | 140° C. |
| $Ti(OCH_3)_4$ | Time | 105 min | 37.7 min | 77.5 min | 13.9 min | 17.1 min |
| $Ti(OC_4H_9)_4$* | | 105 min | 33 min | 61.7 min | 31.3 min | 48.9 min |

*Not according to the invention

What is claimed is:

1. A $Ti(OCH_3)_4$-doped alkali metal and/or alkaline-earth metal aluminium hydride, obtained by a process, comprising intimately mixing:
    an alkali metal and/or alkaline-earth metal aluminium hydride, or
    at least one alkali metal hydride and/or alkaline-earth metal hydride, metallic aluminium and $H_2$,
    with from 0.5 to 20 mol % of $Ti(OCH_3)_4$, based on the moles of Al in the prepared Ti-doped alkali metal and/or alkaline-earth metal aluminium hydride.

2. A Ti-doped alkali metal and/or alkaline-earth metal aluminium hydride according to claim 1, wherein the Ti-doped alkali metal and/or alkaline-earth metal aluminium hydride is Ti-doped $NaAlH_4$, $LiMg(AlH_4)_3$ or $Na_2LiAlH_6$.

3. A $Ti(OCH_3)_4$-doped alkali metal and/or alkaline-earth metal aluminium hydride according to claim 1, obtained by a process wherein an alkali metal and/or alkaline-earth metal aluminium hydride is mixed with $Ti(OCH_3)_4$ and the alkali metal and/or alkaline-earth metal aluminium hydride is an aluminium hydride of the general formula:

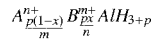

with A, B=an alkali or alkaline-earth metal, n,m=metal ion valence, i.e. 1, 2 or 3,
0≤x≤1, and
1≤p≤3.

4. A Ti(OCH$_3$)$_4$-doped alkali metal and/or alkaline-earth metal aluminium hydride according to claim 1, obtained by a process wherein at least one alkali and/or alkaline-earth metal hydride, metallic aluminium and H$_2$ are mixed with Ti(OCH$_3$)$_4$ and the alkali and/or alkaline-earth metal is selected from the group consisting of Na, Ca, Li and Mg.

5. A Ti(OCH$_3$)$_4$-doped alkali metal and/or alkaline-earth metal aluminium hydride according to claim 4, obtained by a process wherein:
   a) 3 parts NaH, 4.5 parts H$_2$ and at least 3 parts Al, or
   b) 2 parts LiH, 2 parts MgH$_2$, 9 parts H$_2$ and at least 6 parts Al, or
   c) 4 parts NaH, 2 parts LiH, 3 parts H$_2$ and at least 2 parts Al are mixed with Ti(OCH$_3$)$_4$.

6. A Ti(OCH$_3$)$_4$-doped alkali metal and/or alkaline-earth metal aluminium hydride according to claim 1, obtained by a process wherein Ti(OCH$_3$)$_4$ is mixed in an amount in the range of from 1 to 10 mol %, based on the moles of Al in the prepared Ti-doped alkali metal and/or alkaline-earth metal aluminium hydride.

7. A Ti(OCH$_3$)$_4$-doped alkali metal and/or alkaline-earth metal aluminium hydride according to claim 6, obtained by a process wherein Ti(OCH$_3$)$_4$ is mixed in an amount in the range of from 2 to 5 mol %, based on the moles of Al in the prepared Ti-doped alkali metal and/or alkaline-earth metal aluminium hydride.

8. A process for reversibly desorbing and/or absorbing hydrogen using a Ti-doped alkali metal and/or alkaline earth metal aluminum hydride prepared by intimately mixing an alkali metal and/or an alkaline-earth metal aluminum hydride; or at least one alkali metal hydride and/or alkaline earth metal hydride, metallic aluminum and H$_2$ with from 0.5 to 20 mol % of Ti(OCH$_3$)$_4$, based on the moles of Al in the prepared Ti-doped alkali metal and/or alkaline-earth metal aluminium hydride comprising:
   dehydrogenating the at least partially hydrogenated Ti-doped alkali metal and/or alkaline-earth metal aluminium hydride by subjecting the Ti-doped alkali metal and/or alkaline-earth metal aluminium hydride to a temperature of in the range of from 20 to 140° C. and removing a hydrogen-comprising gas to obtain a hydrogen-comprising gas and an at least partially dehydrogenated Ti-doped alkali metal and/or alkaline-earth metal aluminium hydride; and/or
   hydrogenating the at least partially dehydrogenated Ti-doped alkali metal and/or alkaline-earth metal aluminium hydride according to claim 1 or 2 by contacting the at least partially dehydrogenated Ti-doped alkali metal and/or alkaline-earth metal aluminium hydride with a hydrogen-comprising gas at a temperature in the range of from 115 to 180° C. and a hydrogen partial pressure above the equilibrium hydrogen pressure of the at least partially dehydrogenated Ti-doped alkali metal and/or alkaline-earth metal aluminium hydride to reversibly store hydrogen.

9. A process according to claim 8, wherein during hydrogenating the at least partially dehydrogenated Ti-doped alkali metal and/or alkaline-earth metal aluminium hydride is contacted with the hydrogen-comprising gas at a temperature of in the range of from 120 to 160° C.

10. A process according to claim 8, wherein during hydrogenation the at least partially dehydrogenated Ti-doped alkali metal and/or alkaline-earth metal aluminium hydride is contacted with an hydrogen-comprising gas at a pressure in the range of from 1 to 700 bar.

11. A process according to claim 8, wherein during hydrogenation the at least partially dehydrogenated Ti-doped alkali metal and/or alkaline-earth metal aluminium hydride is contacted with an hydrogen-comprising gas at a pressure in the range of from 10 to 150 bar.

12. A process according to claim 8, wherein during hydrogenation the at least partially dehydrogenated Ti-doped alkali metal and/or alkaline-earth metal aluminium hydride is contacted with an hydrogen-comprising gas at a pressure in the range of from 50 to 100 bar.

13. A hydrogen storage material comprising a Ti-doped alkali metal and/or alkaline-earth metal aluminium hydride obtained by a process comprising intimately mixing:
   an alkali metal and/or alkaline-earth metal aluminium hydride, or
   at least one alkali metal hydride and/or alkaline-earth metal hydride, metallic aluminium and H$_2$,
with from 0.5 to 20 mol % of Ti(OCH$_3$)$_4$, based on the moles of Al in the prepared Ti-doped alkali metal and/or alkaline-earth metal aluminium hydride.

* * * * *